(12) United States Patent
Volach

(10) Patent No.: US 10,075,408 B2
(45) Date of Patent: Sep. 11, 2018

(54) MANAGING MESSAGING SESSIONS AMONG MULTIPLE PARTICIPANTS

(71) Applicant: Pecan Technologies Inc, Tortola (VG)

(72) Inventor: Ben Volach, Haifa (IL)

(73) Assignee: Pecan Technologies Inc, Road Town (VG)

( * ) Notice: Subject to any disclaimer, the term of this patent is extended or adjusted under 35 U.S.C. 154(b) by 143 days.

(21) Appl. No.: 15/022,605

(22) PCT Filed: Sep. 16, 2014

(86) PCT No.: PCT/IL2014/050826
§ 371 (c)(1),
(2) Date: Mar. 17, 2016

(87) PCT Pub. No.: WO2015/040612
PCT Pub. Date: Mar. 26, 2015

(65) Prior Publication Data
US 2016/0212091 A1 Jul. 21, 2016

Related U.S. Application Data

(60) Provisional application No. 61/879,159, filed on Sep. 18, 2013.

(51) Int. Cl.
*G06F 15/16* (2006.01)
*H04L 12/58* (2006.01)
(Continued)

(52) U.S. Cl.
CPC ............ *H04L 51/36* (2013.01); *H04L 41/026* (2013.01); *H04L 51/04* (2013.01); *H04L 51/12* (2013.01);
(Continued)

(58) Field of Classification Search
None
See application file for complete search history.

(56) References Cited

U.S. PATENT DOCUMENTS 7,058,586 B1 * 6/2006 Law ............... G06Q 10/02
705/1.1
8,458,264 B1 6/2013 Lee et al.
(Continued)

FOREIGN PATENT DOCUMENTS

WO WO 2015/040612 3/2015

OTHER PUBLICATIONS

International Search Report and the Written Opinion dated Jan. 22, 2015 From the International Searching Authority Re. Application No. PCT/IL2014/050826.
(Continued)

*Primary Examiner* — Younes Naji

(57) ABSTRACT

A method of managing a multi participant messaging session among session participants. The method comprises detecting electronic mails and instant messaging (IM) messages exchanged among session participants participating during a multi participant messaging session, accessing a repository that manages for each of the session participants a user preference profile defining a preferred messaging protocol selected from an email protocol and an IM protocol, identifying, using the repository, first and second groups of the session participants, each member of the first group has an email protocol as the preferred messaging protocol and each member of the second group has an IM protocol as the preferred messaging protocol, formatting the electronic mails such that email content thereof is sent according to the email protocol to each member of the first group, and forwarding the email content for distribution according to the IM protocol for each member of the second group.

27 Claims, 6 Drawing Sheets

(51) Int. Cl.
*H04L 12/24* (2006.01)
*H04L 29/06* (2006.01)
*H04W 4/14* (2009.01)

(52) U.S. Cl.
CPC ............. *H04L 65/403* (2013.01); *H04W 4/14* (2013.01); *H04L 51/066* (2013.01)

(56) References Cited

U.S. PATENT DOCUMENTS

| | | | | |
|---|---|---|---|---|
| 8,555,178 | B2* | 10/2013 | Blair | G06Q 10/107 715/752 |
| 8,769,260 | B1* | 7/2014 | Kwan | G06F 21/00 709/206 |
| 2005/0031093 | A1 | 2/2005 | Skladman et al. | |
| 2005/0108392 | A1 | 5/2005 | Glasser et al. | |
| 2006/0018445 | A1 | 1/2006 | Mittal | |
| 2009/0100134 | A1* | 4/2009 | Svennarp | H04L 67/1095 709/204 |
| 2009/0181702 | A1 | 7/2009 | Vargas et al. | |
| 2009/0221280 | A1* | 9/2009 | Mitelberg | G06Q 10/10 455/418 |
| 2009/0293079 | A1* | 11/2009 | McKee | G06Q 10/105 725/10 |
| 2010/0262660 | A1* | 10/2010 | Little | H04L 67/24 709/206 |
| 2011/0035799 | A1* | 2/2011 | Handler | G06F 21/606 726/21 |
| 2011/0154474 | A1* | 6/2011 | Siegel | G06Q 10/107 726/12 |
| 2012/0124146 | A1 | 5/2012 | Hsiao et al. | |
| 2013/0262589 | A1* | 10/2013 | Dubovik | G06Q 10/107 709/206 |
| 2014/0101264 | A1* | 4/2014 | Dewaele | H04L 51/00 709/206 |
| 2014/0379816 | A1* | 12/2014 | Lin | H04L 51/24 709/206 |

OTHER PUBLICATIONS

International Preliminary Report on Patentability dated Mar. 31, 2016 From the International Bureau of WIPO Re. Application No. PCT/IL2014/050826.

* cited by examiner

MANAGING MESSAGING SESSIONS AMONG MULTIPLE PARTICIPANTS

RELATED APPLICATIONS

This application is a National Phase of PCT Patent Application No. PCT/IL2014/050826 having International filing date of Sep. 16, 2014, which claims the benefit of priority under 35 USC § 119(e) of U.S. Provisional Patent Application No. 61/879,159 filed on Sep. 18, 2013. The contents of the above applications are all incorporated by reference as if fully set forth herein in their entirety.

BACKGROUND

The present invention, in some embodiments thereof, relates to messaging management and, more specifically, but not exclusively, to real time messaging management when a plurality of messaging protocols are available.

During the last years, many messaging protocols have been developed. Session participants uses electronic mails, instant messaging (IM) messages, chat messages, Short Message Service (SMS) messages, and the like in order to communicate with one another.

As SMS messages, email messages and IM messages are fundamentally symmetric forms of communication, once someone sends a recipient an SMS, for example, then the normal way of responding is with a reply SMS. Using different forms of communication leads forces session participants to use forms of communication which they do not master or do not like. An inability to reply in a preferred manner may be frustrating for session participants and may lead to a lost revenue opportunity for telecoms operators.

SUMMARY

According to some embodiments of the present invention, there is provided a method of managing a multi participant messaging session among a plurality of session participants. The method comprises detecting a plurality of electronic mails exchanged among a plurality of session participants participating during a multi participant messaging session, accessing a repository that manages for each of the plurality of session participants a user preference profile defining a preferred messaging protocol selected from an email protocol, an IM protocol, and a cellular messaging protocol, identifying, using the repository, first and second groups of the plurality of session participants, each member of the first group has an email protocol as the preferred messaging protocol and each member of the second group has an IM protocol or a cellular messaging protocol as the preferred messaging protocol, formatting the plurality of electronic mails such that email content thereof is sent according to the email protocol to each member of the first group, and sending the email content for distribution according to the IM protocol or the cellular messaging protocol for each member of the second group.

Optionally, the formatting is performed such that the email content is not sent according to the email protocol to the second group.

More optionally, the formatting is performed by at least one of a plurality of client terminals used for generating the email content and at least one email server receiving the plurality of emails.

Optionally, the method comprises detecting a plurality of instant messaging (IM) messages or a plurality of cellular messages exchanged among the plurality of session participants participating during the multi participant messaging session.

More optionally, the method comprises sending the plurality of IM messages for distribution such that IM content thereof is sent in an email according to the email protocol to each member of the first group and as a message sent according to the IM protocol or the cellular messaging protocol for each member of the second group.

More optionally, the method comprises identifying a message typing by one of the plurality of session participants and presenting a notification indicative of the message typing on an email client module of each member of the first group.

More optionally, the method comprises analyzing the email content and filtering at least some of the plurality of electronic mails from being sent for distribution according to the IM protocol or the cellular messaging protocol for each member of the second group.

Optionally, the formatting is performed at a first simple mail transport protocol (SMTP) server before the first SMTP server relays at least one of the plurality of electronic mails as in incoming message at a second SMTP server.

Optionally, each member of the first group receives at least some of the email content via an email client module and each member of the second group receives at least some of the email content via an IM client module.

Optionally, the user preference profile defines the preferred messaging protocol according to a user defined rule.

More optionally, the user defined rule is a condition on at least one of time of the day, time of the week, a hierarchy of preferred communication protocols, and a current location of a respective the plurality of session participant.

Optionally, the user preference profile defines the preferred messaging protocol according to an event detected on a client terminal used for presenting the email content.

More optionally, the method comprises updating at least one of the plurality of session participants about IM content from the plurality of instant IM messages.

More optionally, the updating is performed by sending an update message that is based on IM content from the plurality of IM messages to the at least one session participant.

More optionally, the method comprises adapting a time tag of the update message to indicate a transmission or reception time that precedes an email of the plurality of electronic mails which has been sent before the update message is created.

Optionally, the formatting comprises formatting in each one of the plurality of emails a plurality of email addresses of the plurality of session participants so that the plurality of emails are sent to a proxy unit.

Optionally, the formatting comprises adding a marker to each one of the plurality of electronic mails, the marker being read by a plurality of recipient clients encoding data from the plurality of electronic mails accordingly.

More optionally, the method comprises acquiring message sending credentials from at least one of the plurality of session participants and using the message sending credentials for sending an invitation to install a client module for participating in the multi participant messaging session to a new session participant.

More optionally, the method comprises acquiring message sending credentials from each of the plurality of session participants and using the message sending credentials for distributing the email content.

More optionally, the method comprises concentrating the IM content from the plurality of IM messages in a summary message and sending the summary message to each member of the first group.

Optionally, the concentrating is performed periodically in a plurality of iterations.

More optionally, the method comprises monitoring an availability status of each one of the plurality of session participants and presenting availability status to each other of the plurality of session participants.

More optionally, the method comprises monitoring a currently preferred messaging protocol of each one of the plurality of session participants and presenting the currently preferred messaging protocol to each other of the plurality of session participants.

According to some embodiments of the present invention, there is provided a method of managing a multi participant messaging session among a plurality of session participants. The method comprises detecting, at a sender side, an electronic mail (email) having media content inputted using an email client module, the email designating a plurality of session participants, accessing a repository that manages for each of the plurality of session participants a user preference profile defining a preferred messaging protocol selected from an email protocol, an instant messaging (IM) protocol, and a cellular messaging protocol, identifying, using the repository, first and second groups of the plurality of session participants, each member of the first group has an email protocol as the preferred messaging protocol and each member of the second group has an IM protocol or a cellular messaging protocol as the preferred messaging protocol, formatting the email, at the sender side, such that the media content is sent according to the email protocol to each member of the first group, and sending the media content for distribution according to the IM protocol or the cellular messaging protocol for each member of the second group.

According to some embodiments of the present invention, there is provided a system of managing a multi participant messaging session among a plurality of session participants. The system comprises a plurality of client side modules installed in a plurality of client terminals for detecting a plurality of electronic mails and a plurality of instant messaging (IM) messages or a plurality of cellular messages exchanged among a plurality of session participants participating during a multi participant messaging session, a repository that manages for each of the plurality of session participants a user preference profile defining a preferred messaging protocol selected from an email protocol, an IM protocol, and a cellular messaging protocol, and a routing module which identifies, using the repository, first and second groups of the plurality of session participants, each member of the first group has an email protocol as the preferred messaging protocol and each member of the second group has an IM protocol or a cellular messaging protocol as the preferred messaging protocol. At least one of the plurality of client side modules and at least one email server format the plurality of electronic mails such that email content thereof is sent according to the email protocol to each member of the first group. At least one of the plurality of client side modules and at least one email server forwards the email content for distribution according to the IM protocol or the cellular messaging protocol for each member of the second group.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
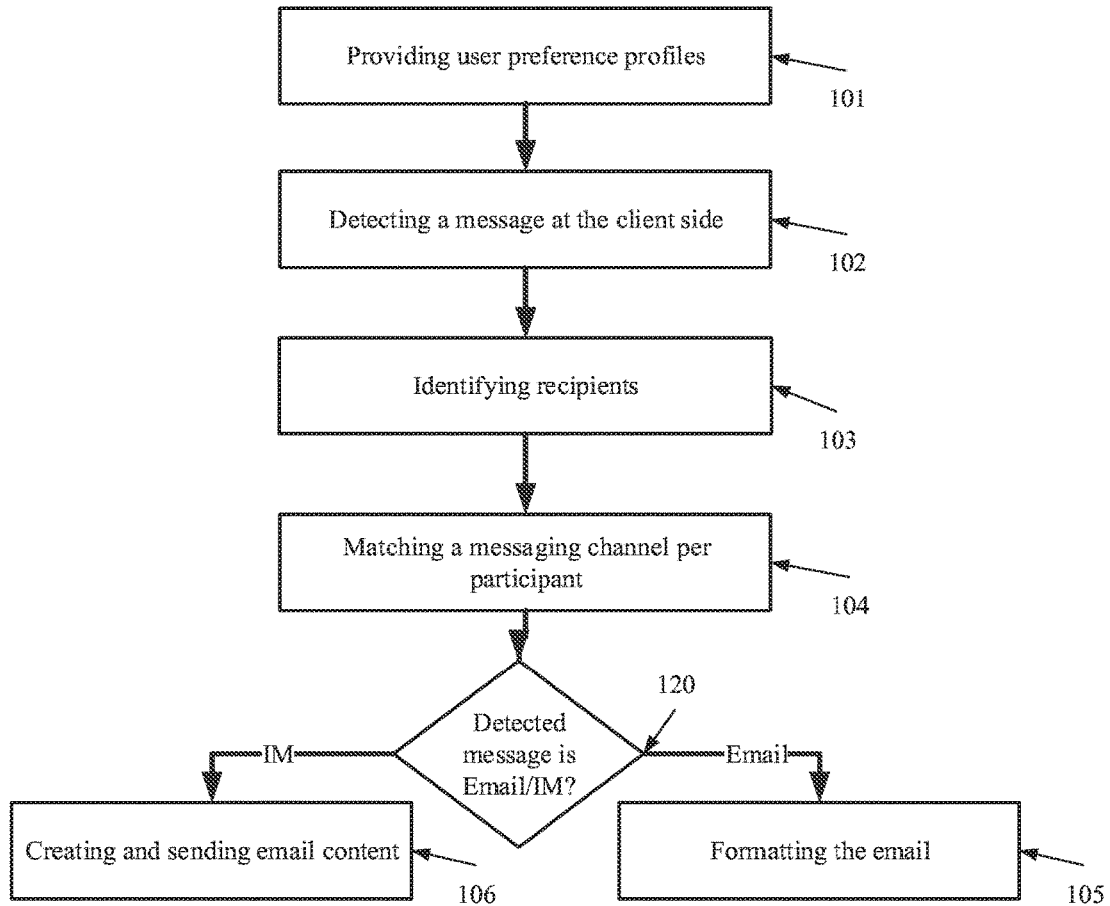
FIG. 1 is a flowchart of a method establishing multi participant communication session among participants who use different messaging protocols for sending media content, according to some embodiments of the present invention.

The present invention, in some embodiments thereof, relates to messaging management and, more specifically, but not exclusively, to real time messaging management when a plurality of messaging protocols are available.

According to some embodiments of the present invention there are provided methods and systems of managing multi participant (two or more) session wherein session participants can communicate with one another using a user selected application (i.e. clients or software) of any of a plurality of different messaging protocols, for example IM protocol and email protocol. In such a manner, a user who prefers sending and receiving message content using email protocol can send emails which are received as IM messages by a recipient that prefers receiving message content using IM protocol, for instance using an IM application that is installed on his device, and vice versa.

Optionally, the methods and systems support the generation of message summary that allows a user to catch up with session messages which have been held without him by other participants of the multi participant session, for instance between users of IM protocol clients where he is set to receive email messages only.

Optionally, the methods and systems support updating an email user about a current inputting of data by an IM user who is also a participant of a multi participant session.

Optionally, the methods and systems provide a policy based solution that adapts the distribution of media content of messages for providing seamless and continuous experience in a messaging protocol hybrid mechanism, allowing session participants who use different messaging editors (and protocols) to communicate with one another in a preferred manner without installing new client software and/or adapting existing user interfaces of currently used messaging editors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the session participant's computer, partly on the session participant's computer, as a stand-alone software package, partly on the session participant's computer and partly on a remote computer or entirely on the remote computer or server. In the latter scenario, the remote computer may be connected to the session participant's computer through any type of network, including a local area network (LAN) or a wide area network (WAN), or the connection may be made to an external computer (for example, through the Internet using an Internet Service Provider). The implementation of software modules may reside on one or more clients, one or more servers, or on any combination thereof. Servers implementation might reside on a local service provider network, on a remote cloud, software as a service provider or any combination thereof. Any of the described Clients might be implemented as a local module or through a web browser to a remote module.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart 100 of a method establishing multi participant communication session among participants who use different messaging protocols for sending media content, for example using IM client module applications and email client modules, according to some embodiments of the present invention. The method allows sending textual, audible, or visible content to one or more recipients such that each recipient receives the media content via a recipient preferred messaging protocol selected from a plurality of different messaging protocols.

As used herein, a messaging protocol may be an electronic mail (email) protocol, an instant messaging (IM) protocol, a cellular messaging protocol, such as a short message service (SMS) or a multimedia messaging service (MMS), and/or the like.

As used herein, an IM protocol includes any chat facilitating messages which distribute media messages in real time (RT) as part of a communication messaging session creating a synchronous flow of messages, for instance a chat, a hangout, or a data sharing process, such as co browsing. As used herein, media content may be image content, textual content, video content, audio content and/or the like. IM protocol may be, for example, Mumble, Gadu-Gadu™, IRC™, Windows Live Messenger™ (MSNP), OSCAR™ (AIM,ICQ), RVP (Windows Messenger™), SIP/SIMPLE™, Skype™, Steam Friends™, TOC2™, Windows Messenger Service™, OMA-IMPS, RCS, XMPP/Jingle (Google Talk™), YMSG (Yahoo! Messenger™), and Zephyr Notification Service™. Email protocol may be, for example, point of presence (POP), for example POP3, internet message access protocol (IMAP), message application programming interface (MAPI), and HTTP, and simple mail transport protocol (SMTP).

The method allows establishing a messaging session among a plurality of session participants who use different messaging protocols during the messaging session, optionally subscribers. As used herein, a messaging protocol describes a protocol and supporting system(s) for exchanging messages among session participants. For example, a messaging protocol may be an email protocol, indicating that an email client module is used to send and/or receive an email sent via email server and/or services. In another example, a messaging protocol may be an IM protocol, indicating that an IM client module is used to send and/or receive an IM message over a communication network, such as the internet, for instance using an IM and presence server (see 210 in FIG. 2). In another example, a messaging protocol may be a cellular messaging protocol, indicating that a cellular messaging client, for instance an SMS, is used to send and/or receive SMS messages over a cellular network. For brevity, IM messages cover SMS messages. The method allows the participants to exchange messages with using different messaging protocols using their favorite editor, for instance using their email client module for communicating with participants who use IM client modules and participants who use SMS editors and/or other email client modules.

Figure 2:
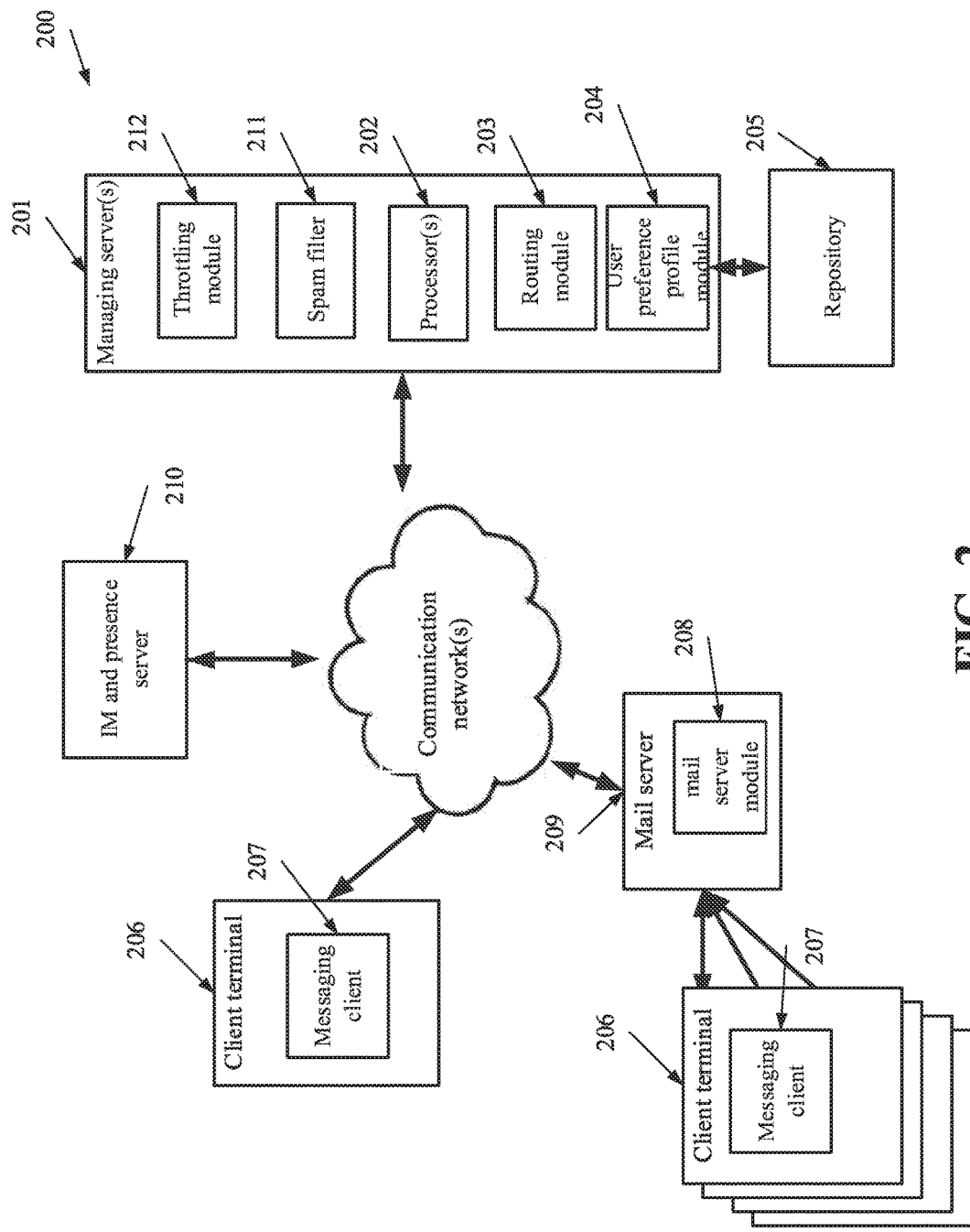
FIG. 2 is a schematic illustration a system for establishing and/or managing messaging sessions, for instance by implementing the method depicted in FIG. 1, according to some embodiments of the present invention.
Figure 3:
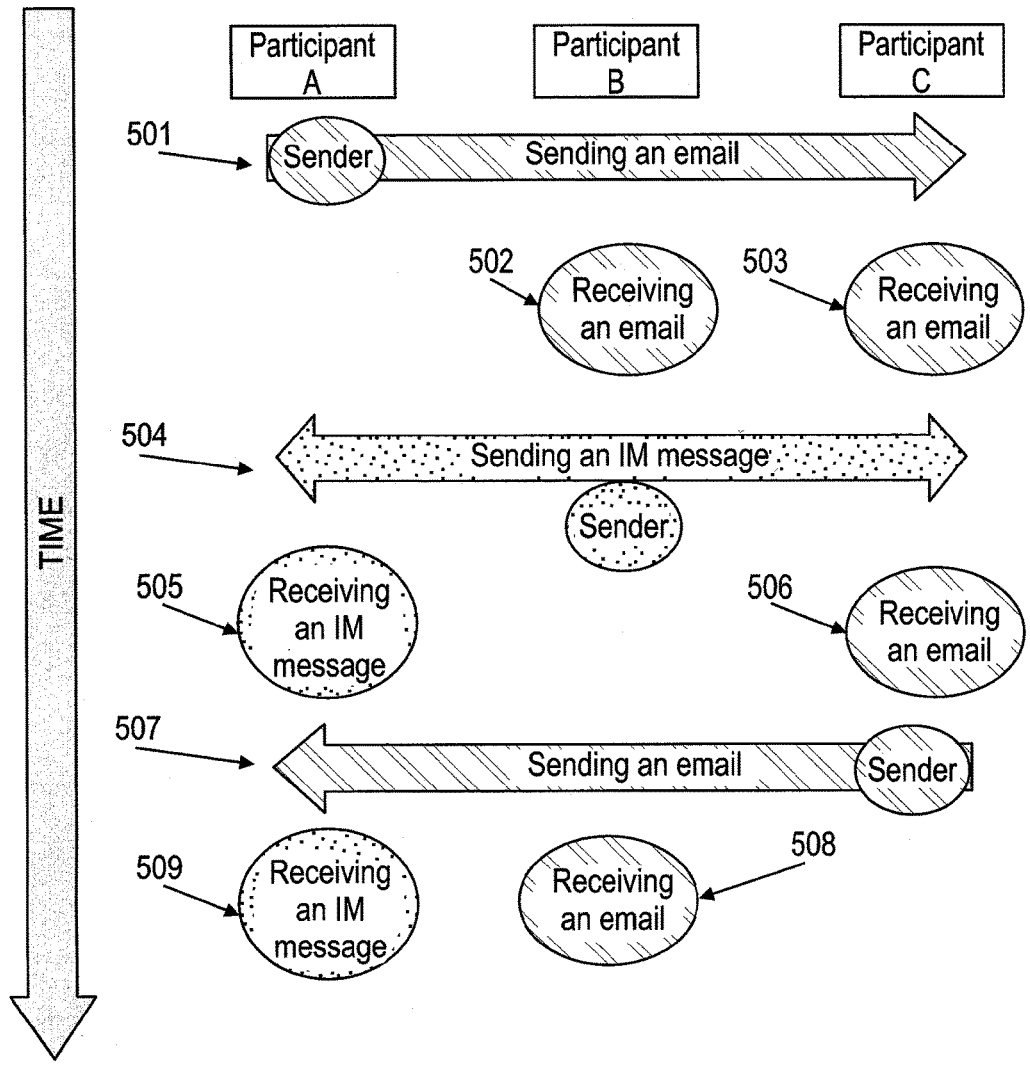
FIGS. 3, 4, 5 and 6 are flowcharts depicting a flow of messages in exemplary messaging sessions, according to some embodiments of the present invention.

Reference is also made to FIG. 2, which is a schematic illustration a system 200 for establishing and/or managing messaging sessions, for instance by implementing the method depicted in FIG. 1, according to some embodiments of the present invention. From the user experience point of view, for example as depicted in the flowchart of FIG. 3, the system and method allow one participant (i.e. participant A; 501) to send other participant emails (i.e. participants B and C; 502 503) and one of the participant to reply with an IM message (i.e. participant B; 504) where the reply is received at one participant as an IM message 505 and in another participant as an email 506. Another participant may send an email using his email client module (i.e. participant C; 507) and the content may be received at other participants via an email client module and an IM client module (i.e. participants B and A; 508 509). With regards to FIGS. 3-6, it should be noted that horizontal arrows depict message sending events, elliptical text bubble indicate message reception events or action states (when the bubble is not filled), vertical arrows indicate a timeline, dotted filling indicates an IM protocol action, and stripped filling indicates an email protocol action.

The system 200 may be a policy based system that adapts the distribution of media content of messages for providing seamless and continuous experience in a messaging protocol hybrid system that allows session participants who use different messaging editors (and protocols) to communicate with one another in a preferred manner. For example, the system 200 allows first session participants who prefer receiving and sending emails using an email client module to communicate with second session participants who prefer receiving and sending IM messages using an IM client module while the first session participants use email client modules, such as Microsoft Outlook™, Thunderbird™, Gmail™ or Apple Mail™, optionally at the same manner the email client modules are used for receiving and sending emails and the second session participants use IM client modules, such as WhatsApp™ or Line™, optionally at the same manner the IM client modules are used for receiving and sending IM messages.

The system 200 offers real time (RT) integration of IM client module session participants in a messaging session that is held among email session participants without sacrificing the ability of email session participants to communicate with other participants, for example by adding email recipients to an ongoing messaging session and/or real time (RT) integration of email client module session participants in a messaging session that is held among IM session participants without sacrificing the ability of IM session participants to communicate with other participants, for example by adding IM recipients to an ongoing messaging session.

Optionally, the system 100 manages the distribution of message content among a plurality of recipients such that some recipients receive the message content encoded as email content and some recipients receive the message content encoded as an IM message. This also allows each one of the recipient to respond to the received message content via the messaging protocol they prefer, optionally in a seamless manner to the other recipients who may not be able to know which editor and/or messenger the senders use.

The system 200 includes a processor based network node, such as one or more managing servers 201. The one or more managing servers 201 include one or more computerized processor(s) 202, such as central processor unit(s) and a routing module 203 that forwards message content based on user preference profile and/or system logic. The system 200 may include a user preference profile module 204 that manages a plurality of session participant preferences profiles stored in a repository (i.e. database) 205, either locally or remotely, and for instance as described below.

Optionally, the system 200 includes a spam filter 211 which reviews message content to prevent from IM session participants to receive spam messages from email accounts and/or email session participants to receive spam messages from IM accounts. The spam filter may be internal or provided by an external service to which messages are forwarded for analysis. Optionally, the system includes a throttling module 212, which applies decision logic as to which messaging protocol to use and when and/or how to filter and/or amend sent messages. The logic is optionally based on the user preference modules. For example, the throttling module 212 may decide when to send emails or IM messages based on time, number of aggregated messages, accumulated size of messages and/or other parameters. The throttling module 212 may send emails using the original address of the sender, for example using credentials which are received as described below, or as using a special addressing of the system. The special address of the system may be formed such that when a session participant replies to a message from this address, the reply is distributed to all other session participants.

The system 200 may include one or more messaging client modules 207 which may be installed on client terminal 206 such as laptops, desktops, Smartphones, tablets, smart glasses, and/or any other user controlled computing unit. It should be noted that the messaging client modules 207 may be implemented using cloud technologies, for example as browser based clients having a graphical user interface (GUI) presented to a user using the client terminal 206. In such embodiments, all or some of the functions of the messaging client modules 207 which are described herein are performed by the routing module 203. The routing module 203 is supported by the processing unit(s) 202 and/or any other centralized or distributed computing units (for example any processor not logically controlled by the operating system of the client terminals 206). The system 200 may include a mail server module 208 that is installed in a mail server 209, for example in a simple mail transfer protocol (SMTP) server for editing sent emails, for example by adapting email relay, for instance during an SMTP relay.

As depicted by numeral 207, the messaging client modules 207 may be installed in the client terminals 206 themselves, for instance as applications, personal information management software add-ons, for example Outlook™ add-ons, browser add-ons, integral part of messaging software, for example product, an e-mail information management software product and/or the like. Optionally, the messaging client modules 207 include an IM client module for allowing the client to generate IM messages. Optionally, the messaging client modules 207 are integrated into existing IM client modules. Optionally, the messaging client module 207 is integrated into an email client module and into an IM client module which are independent from one another. Optionally, the messaging client module 207 includes both an email client module and an IM client module. In such embodiments, the messaging client module 207 manages dual stacks for email messages and IM messages. This messaging client module 207 is able to send/receive emails and be engaged with IM communication. Although those two streams may come from different servers and/or sources, the messaging client module 207 may merge them to one coherent and ordered view.

As depicted in 101, the system 200, for example the user preference profile module 204 manages a plurality of user preference profiles where each user preference profile defines for one of a plurality of session participants, for example a subscriber of the system 200, a preferred messaging protocol. The preferred messaging protocol may be selected from an electronic mail (email) protocol, an instant messaging (IM) protocol, and a cellular messaging protocol. The user preference profile may include one or more record(s) which define a preferred communication protocol of a session participant, optionally in predefined conditions. For example, a user preference profile may define a default preferred communication protocol of a session participant, rules for when to use one communication protocol or another, and/or a hierarchy of preferred communication protocols which are available for usage. In another example, different preferred communication protocols are set for different times of the day and/or of the week. In another example, different preferred communication protocols are location based, for example using locational data of the hosting client terminal(s) 206. In another example, different preferred communication protocols are event based, for example depend on event of the application(s) the hosting client terminal(s) 206 such as online status of the recipient (e.g. online recipient will get an IM, while offline recipient will receive an email). In such embodiments, when the user is indicated as being in a meeting, for example based on an analysis of the schedule of the user, a designated preferred communication protocol is selected. In another embodiment, a designated preferred communication protocol is selected when the user uses the client terminal for talking and/or for performing another function.

Now, as shown at 102, a message having media content provided by a session participant, for example an email or an IM message, is intercepted at the sender side, for example by the messaging client and/or the mail server client 208. This content may be referred to herein as message content. The message may designate one or more recipients. Optionally, the media content is a message created using a standard email client module on a client terminal 206.

Optionally, the message is analyzed to determine whether is designated to be handled by the system 200. For example, an indicator, also referred to herein as a marker, is added to system, for instance a flag and/or any other label. The marker is added to the metadata and/or to the body of the message. If the message marked as designated to be handled by the system 200, it distributed according to the system logic, for example as described below and if the message marked as designated not to be handled by the system 200, it is forwarded as is from the sender side.

Optionally, the marker is an identifier added to the header of a message, for example to a Proprietary E-Mail header. Optionally, the message-ID is formatted to include a unique prefix as a marker. For example, the unique prefix is numeric where the value "2" indicates that the message is handled by the system 200. Optionally, a unique string is added to the message ID, for example, string Message ID may be added with a literal prefix "Mix-Mode" that does not appear in other messages. Optionally, headers are adapted when message(s) are sent using reply or reply all functions. Optionally, body of the message is adapted to include a marker. Optionally, an object is embedded in a message as a marker, for example a web bug. Optionally, metadata is updated with a marker.

Optionally, the messaging client module 207 reviews the received emails, identifies markers, and notifies the managing server(s) 201 accordingly. The managing server(s) 201 may use push notification such as internet message access protocol (IMAP) IDLE to intercept emails and identify specific markers such as the mix-mode identifiers which are described below. In such embodiments, the system 200 may extract stored IM messages that were not delivered to some session participants and send the IM content of these IM messages in one or more email messages. As described below, these emails are manipulated to precede in time the intercepted email message (most email clients order received emails by time and thus context of the email correspondence timeline is kept. Optionally, the managing server(s) 201 may use periodic fetch and/or polling mechanism for acquiring data from messaging client modules 207. After receiving notifications about the reception of messages at the messaging client module 207, the managing server(s) 201 may instruct the deletion of redundant messages (i.e. summarized in a summary message or sent twice, via email and IM). As described above, the managing server(s) 201 may send summary messages, update availability status and/or adjust (tweak) time tags as described below.

Optionally, the messaging client module 207 deletes message upon receipt. Optionally, push server(s) may support this extension so that offline clients do not receive the email.

Now, as shown at 103, one or more recipients of the message are identified at the sender side. For example, the message is an email and the one or more recipients are extracted from the "TO" field(s) and/or from the "RCPT TO" field at the sender side.

This allows, as shown at 104, a messaging protocol to be selected for each recipient. For example, during the process it is identified which of the recipients is interested in receiving content message in an email and which of the recipients is interested in receiving content message in an IM message. For instance, records of recipients are identified in user preference profiles stored in the repository (i.e. database) 205. These records allow selecting a preferred messaging protocol for each recipient. These records may be accessed or acquired by querying the user preference profile module 204.

Additionally or alternatively, a local policy may be maintained at the client side to determine which messaging protocol to use for each one of the recipient. This may be determined by local logic or database.

Additionally or alternatively, a supplementary policy server and/or registry and/or directory and/or database and/or dynamic service and/or external network resources is consulted for selecting messaging protocols.

Additionally or alternatively, a mechanism in which a sender attempts to send an IM to one or more recipients and the system fails to deliver the IM, for example when no acknowledge is identified, an email protocol may be selected and email may be sent by the respective messaging client module and/or a different routing is selected for the IM message by the managing module 203.

Additionally or alternatively, the client messaging module 206 may be aware and/or present an updated status for each participant in a messaging session and/or other system users prior to and/or during a composition of a message and/or when a desire to compose a message is identified, for instance by addressing a contact list, phonebook, and any other mention of a contact name, for instance in a document or by giving voice instructions. Example for such a status might be to indicate availability to communicate and/or a preferred protocol "IM capable" or "Email capable".

Optionally, session participant provides email credentials, for example using a UI, to allow the system 200 to perform actions on behalf of the participant's email account. Such actions may include the ability to control the sender address for automatically sending different messages such as invite to download the IM client module, invite to register to the system, and invite to use a web client module. These credentials may be used for sending summary messages as described herein.

Additionally or alternatively, a list of recipients and their preferred messaging protocols is embedded inside the body of the message, indicating the user that a Reply-To-All is needed and disclosing all recipients of such action.

Optionally, the list is embedded inside a "To: recipient address" display, so "To address" have only E-Mail recipients, but their display name mismatch them and identifies all.

Additionally or alternatively, addresses of the recipient are replicated, for example Bob@gmail(dot)our-domain(dot)com is created for Bob@gmail(dot)com. In use, recipients may be deduced from the replica addresses. This allows a relay on a different domain to catches the email and to send and/or to reply-to-all and/or to handle the email well.

Optionally, the routing module gathers IM content from IM messages sent among session participates of a certain messaging session and generates accordingly a summary message, optionally periodically in iterations, for instance every 1 minute, 5 minutes, 10 minutes, 15 minutes and/or any intermediate or longer periods. The summary message is sent to other session participates of the messaging session, optionally periodically in iterations, for instance every 1 minute, 5 minutes, 10 minutes, 15 minutes and/or any intermediate or longer periods. This allows the other participants, for example participants selected to receive messages via an email client only, to catch up with session messages which have been held without them during the multi participant session, for instance between users who preferred using IM protocol clients.

Reference is now made to 105, 106 and 120 which depict optionally functionalities for treating an email at the sender side (either a client module or an email server module).

Optionally, if the message is an email, as shown at 105, it is formatted, at said sender side, so that it sent in an SMTP delivery only to recipients who have been identified as session participants who currently prefer the email protocol as a preferred protocol. The media content is forwarded to other session participants via the protocols they have selected, using the messaging client module 207 or the mail server client 208 or the one or more managing servers 201, for instance the routing module 203.

For example, as described above, a list of recipients is identified by an analysis of the "TO" field(s). Then, the mail server client 208 and/or the messaging client module 207 formats the "RCPT TO" field(s) in the email to include only the session participants who currently prefer the email protocol as a preferred protocol, removing session participants who currently prefer other messaging protocols as a preferred protocol. Optionally, the SMTP stack is modified to break the symmetry between the "TO" field(s) and the "RCPT TO" field(s) in the email. In such a manner, session participants who currently prefer other messaging protocols, for example the IM protocol, will not get the email; however, the email addresses of the session participants who currently prefer other messaging protocols remains in the "TO" field(s) such that if any of the email recipients will send an email using a "reply to all" function, they will receive it. Leaving all original recipients in the "TO" field(s) ensure transparency and messaging session continuity.

It should be noted that when the message is an email, it may only be formatted and not resent via another address, the sent email is identified as an email from the creator of the media content it contains and not as an email from a server or a proxy and therefore will not be classified as a spam based on its origin. One reason to implement this is in order for the recipient to trust the sender.

Optionally, if the message is an IM, as shown at 106, it is forwarded to session participants who have been identified as session participants who currently prefer the IM protocol as a preferred protocol and forwarded to an email server, at the sender side, so that it sent as an email, for example in an SMTP delivery, to session participants who have been identified as session participants who currently prefer the email protocol as a preferred protocol.

As described above, the list of recipients is analyzed to determine which messaging protocol should be used for each recipient where the messaging protocols are selected according to the user preference profiles of the recipients (i.e. participants of the messaging session). When a recipient is not associated with a user preference profile, for example not a subscriber of the system 200, his address, as specified in the sent message, is used for sending a link or any other reference for downloading the messaging client module 207, installing the mail server module 208, and/or registering to the system 200. The address may be, for example, an email, an IM identifier, and/or a phone number.

Figure 4:
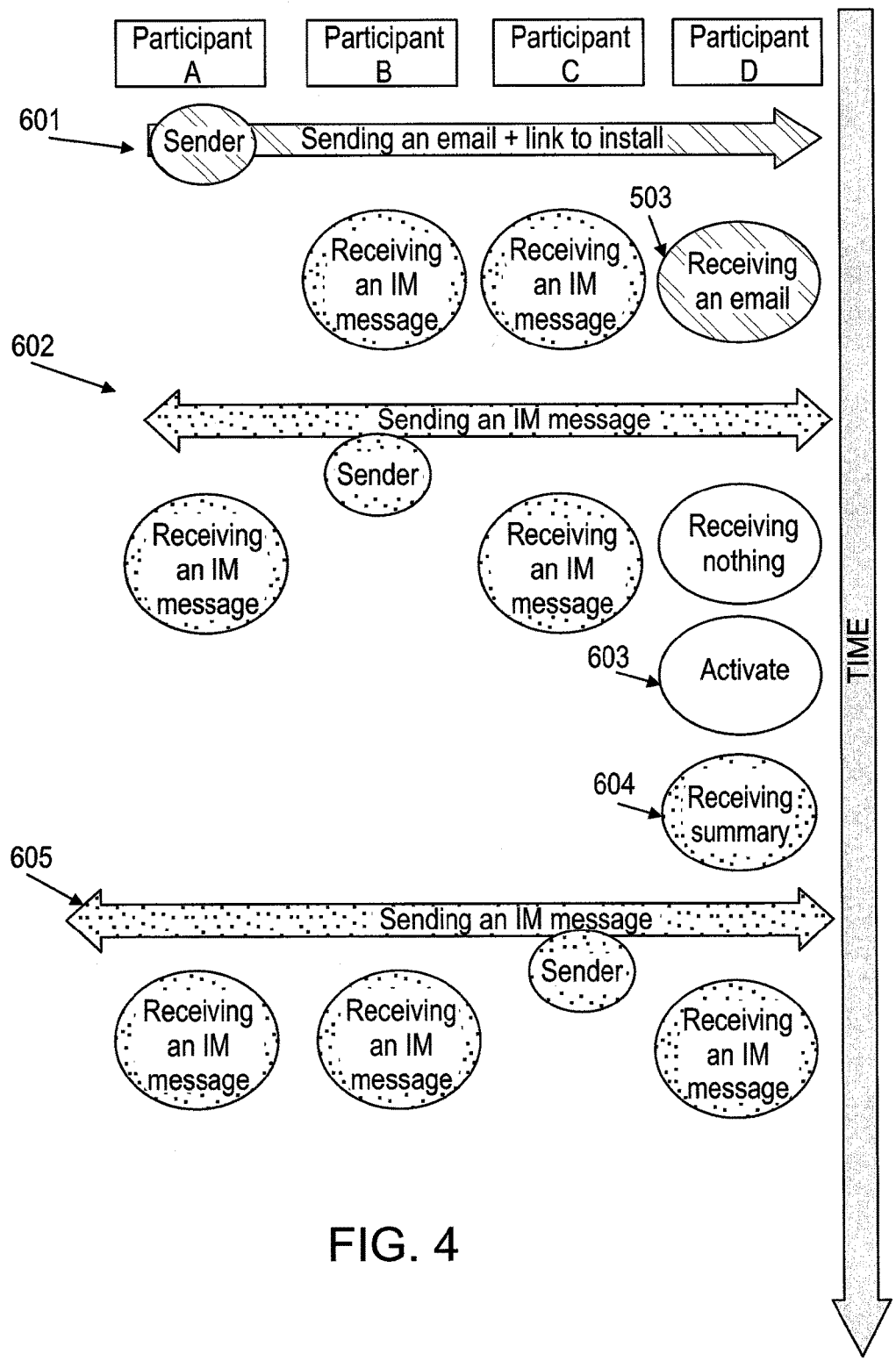

Optionally, the system 200 logs the media content of messaging sessions which include message formatted and/or distributed thereby. In such embodiments, when a participant of the messaging session is subscribed or otherwise joins the system 200, for example by installing the client 207, the system 200 can forward the previous media messages of the messaging session to him, for instance as a summary, a transcript, and/or the like, either as a separate message or with the next message of the messaging session. For example, FIG. 4 is schematic illustration of a flowchart depicting a flow of messages in an exemplary messaging session, according to some embodiments of the present invention. In this exemplary messaging session, as shown at 601, session participant A sends an email message. The system 200 identifies that session participants B and C are registered and session participant D is unregistered to the service. Session participants B and C receive an IM message with the message content from session participant A, for instance a copy of the email content in an IM message. Session participant D receives the message content from session participant A in an email with a link for downloading the messaging client module 207. This may be enabled with a web client and/or hypertext markup language, such as HTML5 widget, a JavaScript implementation, add-on to browser and alike. The messaging client module 207 enables session participant D to experience an RT experience while using an email, for example by modifying messaging session related emails to include the previous messages of the messaging session.

Optionally, a message that includes a reference or a link (e.g. as shown at 601) to install the messaging client module 207 and/or to register to the system 200 is deleted after installation or registration is completed, for instance by the messaging client module 207 and/or the mail server module 208.

Optionally, a message that includes a reference or a link to a web client module. The web client runs at the context of the Client terminal. The web client may provide IM functionality to supplement email client modules, without the need to download and install the IM client module.

According to some embodiments of the present invention, a plurality of message copies of a message is sent to a plurality of the recipients in a distribution list, optionally selected as above, where each copy includes a different unique reference or link to an external resource such as a web bug, for example a Universal Resource Identifier (URI), for instance a different Uniform Resource Locator (URL). This allows identifying a client, a recipient processing the unique reference or link. In such embodiments, while the mail server 209 sends N different copies with different links (N=number of unique recipients), only one copy is stored in the sent item folder of the sender. This allows identifying which recipient read the message and optionally when, for example by an icon which is presented near his name or address in the respective inbox and/or send item folder.

Additionally or alternatively, code lines such as X-headers are added into email headers such as "X-Confirm-Reading-To:"; "Disposition-Notification-To:" or "Return-Receipt-To:" or as part of the SMTP protocol request.

Additionally or alternatively, read-recipient report code may be added into the body of the copy to induce a read report non-selectively, for example when a client module is installed and/or when the email is read by a browser client (e.g. using an toolbar add-on and/or a script).

According to some embodiments of the present invention, a read indication is presented not only to the sender but also to other recipient of the message. This may be performed as if each of the recipients is the sender, for example as described above. Read indications may be sent to the messaging client 207 and/or respective module which generates a browser based presentation. Another option would be for the sender client to re-distribute the read indication to other recipients of the message after it the read indication has been received.

As shown at 602, session participant B now sends a chat message that is forwarded only to respective subscribers of the system 200 who are identified as preferring the IM protocol, namely session participant A and C. The message is not forwarded to session participant D. After participant D activates the system 200, as shown at 603, for example by installing the messaging client module 207, an history email or an history IM message with previous correspondences (related to the respective messaging session) is forward thereto 604, for instance in an IM message. Optionally, the email with the link is deleted from the "Sent Items" folder of the sender and/or the inbox of the recipient to avoid redundancy. As shown at 605, now, when participant C sends an IM message, it is received by all participants.

Figure 5:
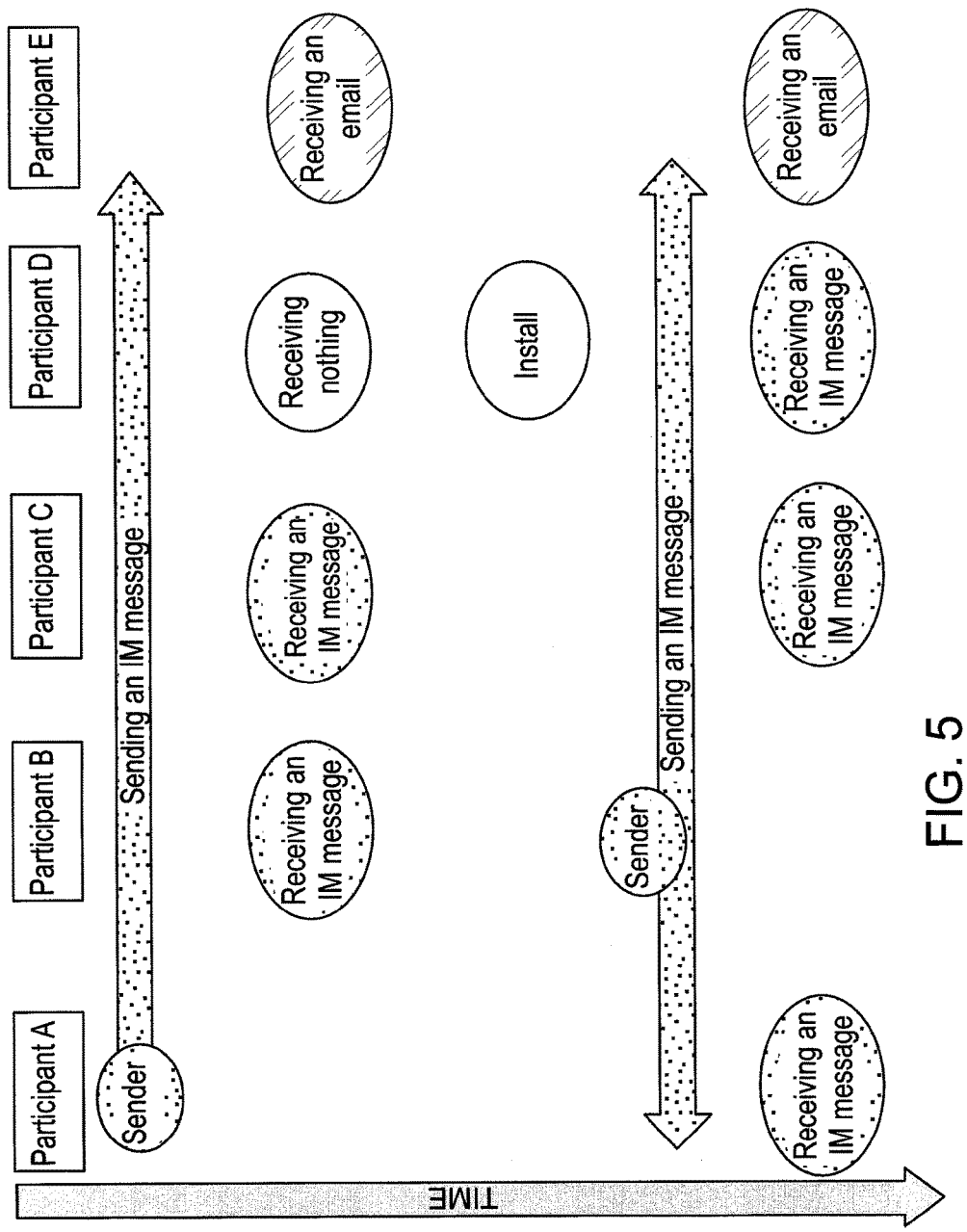

Another example is depicted in FIG. 5 which is a schematic illustration of a flowchart depicting a flow of messages in another exemplary messaging session, according to some embodiments of the present invention. In this example, session participant A sends an IM message to session participants B, C, D, E (for example by designating email addresses) where session participant D is not registered and did not install the messaging client module 207 Therefore session participant D does not receive the IM message as long as he does not install the messaging client module 207 or register. In addition, participant E is registered to system 200 with user preference profile which directs to get an email at this specific time (according to time-based policy).

According to some embodiments of the present invention, the time tags of messages, for example emails, such as system generated emails which include a summary of the previous historical session related messages is adapted such that it appears as sent before other email(s) of the session. In such a manner, the timeline in which messages of the sessions is presented in the inbox of the recipient(s) corresponds with the actual timeline of the transmission and/or reception of the messages.

Figure 6:
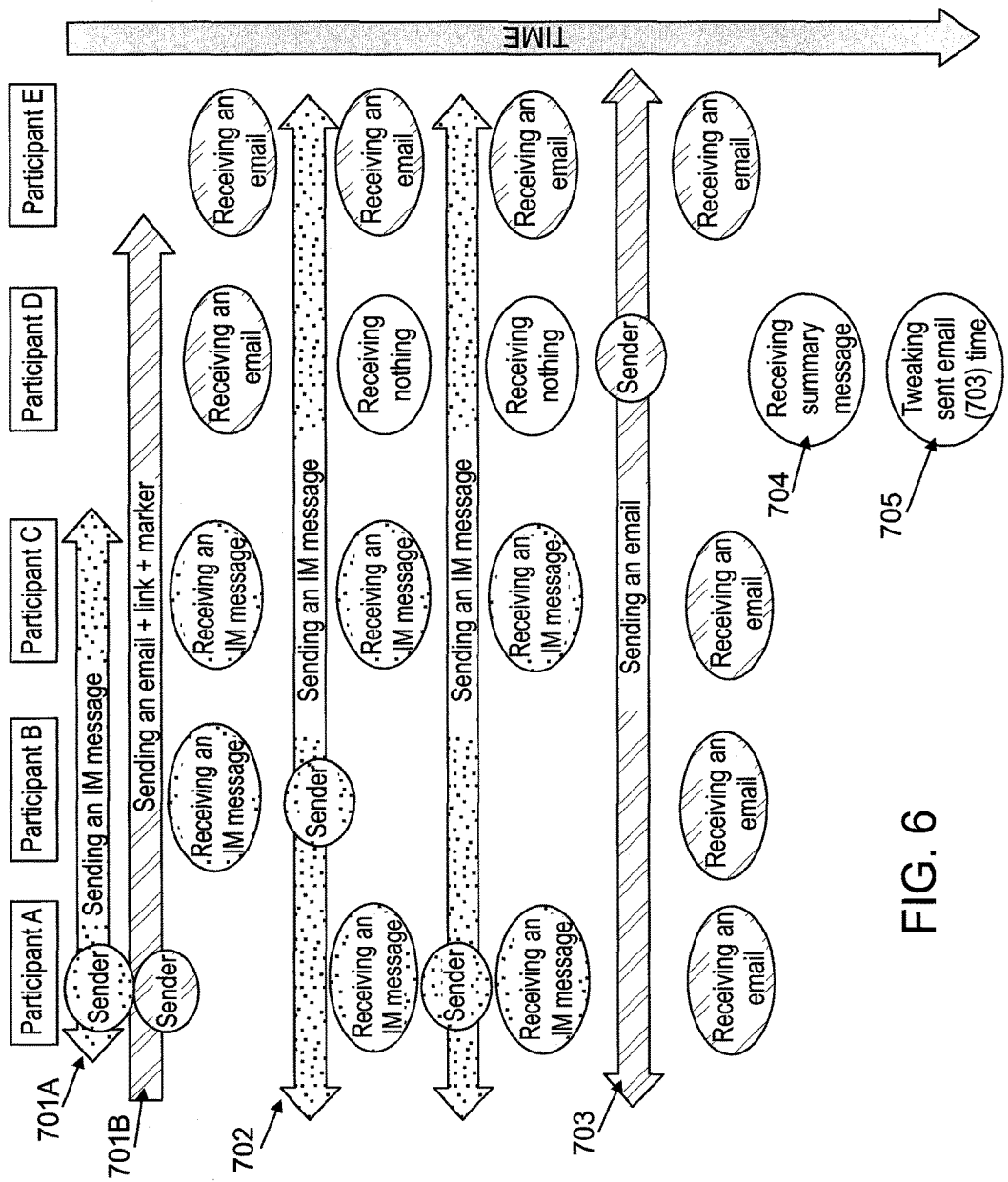

As described above, messages are optionally marked with a marker indicating they are messages handled and/or set to be handled by the system 200. FIG. 6 is a schematic illustration of a flowchart depicting a flow of messages in another exemplary messaging session where a message is sent with a marker, according to some embodiments of the present invention. As shown at 701A, session participant A sends an IM to participants B and C and as shown at 701B email with reference to join the system 200 and a marker, a Mix-Mode identifier to participants D and E. As shown at 702, participant B replies by IM message sent to all session participants. Participants A and C get IM, participant D receives nothing, and participant E has a user preference profile which includes policies to receive email only at this time and no throttling. As shown at 703, at a later time (e.g. 16:00), session participant D sends an email to all session participants, for instance by using reply all function on his email client module. The email is marked with a marker indicating it is part of the session. The email is intercepted at the recipient side, for instance based on the marker, by the messaging client module 207 or the mail server module 208. Consequently, as shown at 704, the system 200 generates a summary message that includes an historical messaging summary, including the IM messages sent at 702, (e.g. before 16:00). Optionally, the history message may be added to the email session participant D sends. Optionally, the history message is sent separately from the email session participant D sends. Optionally, the email session participant D sends is halt until the history message is sent. Optionally, as shown at 705, time tag of the history message and/or of the email which induces the sending of the summary message is tweaked to a previous time before the email session participant D sends, in order to maintain the messaging session order.

It should be noted that emails which are treated by the system 200 are marked with a marker, a summary may be generated and sent to some participants. Additionally or alternatively, marked messages may be deleted after summary email is sent.

As described above, the system 200 and method 100 allow email users to receive message content inputted using an IM client module and sent originally as an IM message in a seamless manner. According to some embodiments of the present invention, an indication which indicates to one session participant that another session participant is currently inputting message content is presented on an email client module. This indication maybe referred to herein as an "is writing a message" (IWAM) indication. In such a manner, a session participant who selected the email protocol as a preferred protocol may receive notifications that session participants who selected the IM protocol as a preferred protocol and use an IM client module receives. Optionally, the messaging client module 207 includes an IWAM sub module that presents an indication on the screen of one session participant when another session participant inputs message content. For example, a JavaScript supporting email client module (limited today, may exist more in the future) allows the email to query a web server. Another example is an object, such as a graphics interchange format (GIF), attached to the message. This object is used to get dynamically the status of IM client modules used by other participants, for example from the IM and presence server 210. The IM and presence server 210 may be also used for monitoring status of each session participant, for example as described below. In another example, every state change is sent as an email, captured by messaging client module 207 that presents the notification accordingly and optionally deletes the received email from the inbox of the recipient. Optionally, the messaging client module 207 includes an IWAM sub module that detects when a session participant input data to an email client module and forward the data so as to allow the presentation of a IWAM indication to session participants, for example on their email client module and/or IM client module.

The methods as described above are used in the fabrication of integrated circuit chips.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term messaging protocol is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of managing a multi participant messaging session among a plurality of session participants, comprising:
    detecting a plurality of electronic mails exchanged among said plurality of session participants participating during said multi participant messaging session;
    accessing a repository that manages for each of said plurality of session participants a user preference profile defining a preferred messaging protocol selected from an email protocol, an IM protocol, and a cellular messaging protocol;
    identifying, using said repository, a first group in said plurality of session participants, each member of said first group is defined in said repository as having an email protocol as said preferred messaging protocol;
    identifying, using said repository, a second group in said plurality of session participants, each member of said second group is defined in said repository as having an IM protocol or a cellular messaging protocol as said preferred messaging protocol;
    formatting said plurality of electronic mails, having email content, according to said email protocol and sending said formatted plurality of electronic mails to each member of said first group; and
    sending said email content for distribution according to said IM protocol or said cellular messaging protocol to each member of said second group;
    wherein said formatting comprises formatting a plurality of RCPT TO fields in each one of said plurality of emails to include at least one member of said first group and not to include any member of said second group while at least one TO field in respective said email includes all members of said first group and of said second group of said multi participant messaging session.

2. The method of claim 1, wherein said email content is not sent according to said email protocol to said second group.

3. The method of claim 2, wherein said formatting is performed by at least one of a plurality of client terminals used for generating said email content and at least one email server receiving said plurality of emails.

4. The method of claim 1, further comprising detecting a plurality of instant messaging (IM) messages or a plurality of cellular messages exchanged among said plurality of session participants participating during said multi participant messaging session.

5. The method of claim 4, further comprising sending an IM content of said plurality of IM messages in an email according to said email protocol to each member of said first group and sending said IM content of said plurality of IM messages as a message sent according to said IM protocol or said cellular messaging protocol for each member of said second group.

6. The method of claim 5, further comprising identifying a message typing by one of said plurality of session participants and presenting a notification indicative of said message typing on an email client module of each member of said first group.

7. The method of claim 1, further comprising analyzing said email content and based on said analysis, filtering at least some of said plurality of electronic mails from being sent for distribution according to said IM protocol or said cellular messaging protocol for each member of said second group.

8. The method of claim 1, wherein said formatting is performed at a first simple mail transport protocol (SMTP) server before said first SMTP server relays at least one of said plurality of electronic mails as in incoming message at a second SMTP server.

9. The method of claim 1, wherein each member of said first group receives at least some of said email content via an email client module and each member of said second group receives at least some of said email content via an IM client module.

10. The method of claim 1, wherein said user preference profile defines said preferred messaging protocol according to a user defined rule.

11. The method of claim 10, wherein said user defined rule is a condition on at least one of time of the day, time of the week, a hierarchy of preferred communication protocols, and a current location of a respective said plurality of session participant.

12. The method of claim 1, wherein said user preference profile defines said preferred messaging protocol according to an event detected on a client terminal used for presenting said email content.

13. The method of claim 4, further comprising updating at least one of said plurality of session participants about IM content from said plurality of instant IM messages.

14. The method of claim 13, wherein said updating is performed by sending an update message that is based on IM content from said plurality of IM messages to said at least one session participant.

15. The method of claim 14, further comprising adapting a time tag of said update message to indicate a transmission or reception time that precedes an email of said plurality of electronic mails which has been sent before said update message is created.

16. The method of claim 1, wherein said formatting comprises formatting in each one of said plurality of emails a plurality of email addresses of said plurality of session participants and sending said plurality of emails to a proxy unit.

17. The method of claim 1, wherein said formatting comprises adding a marker to each one of said plurality of electronic mails, said marker being read by a plurality of recipient clients encoding data from said plurality of electronic mails accordingly.

18. The method of claim 1, further comprising acquiring message sending credentials from at least one of said plurality of session participants and using said message sending credentials for sending an invitation to install a client module for participating in said multi participant messaging session to a new session participant.

19. The method of claim 1, further comprising acquiring message sending credentials from each of said plurality of session participants and using said message sending credentials for distributing said email content.

20. The method of claim 4, further comprising concentrating said IM content from said plurality of IM messages in a summary message and sending said summary message to each member of said first group.

21. The method of claim 20, wherein said concentrating is performed periodically in a plurality of iterations.

22. The method of claim 1, further comprising monitoring an availability status of each one of said plurality of session participants and presenting availability status to each other of said plurality of session participants.

23. The method of claim 1, further comprising monitoring a currently preferred messaging protocol of each one of said plurality of session participants and presenting said currently preferred messaging protocol to each other of said plurality of session participants.

24. The method of claim 1, further comprising adding, in real time, at least one of at least one new email recipient and at least one new IM recipient to said multi participant messaging session.

25. The method of claim 1, further comprising analyzing each of said plurality of electronic mails to identify when an indicator is included in a content of each of said plurality of electronic mails and conducting said accessing, said identifying, said formatting and said sending according to said identified indicator.

26. A method of managing a multi participant messaging session among a plurality of session participants, comprising:
detecting, at a sender side, an electronic mail (email) having media content inputted using an email client module, said email designating said plurality of session participants;
accessing a repository that manages for each of said plurality of session participants a user preference profile defining a preferred messaging protocol selected from an email protocol, an instant messaging (IM) protocol, and a cellular messaging protocol;
identifying, using said repository, a first group in said plurality of session participants, each member of said first group is defined in said repository as having an email protocol as said preferred messaging protocol;
identifying, using said repository, a second group in said plurality of session participants, each member of said second group is defined in said repository as having an IM protocol or a cellular messaging protocol as said preferred messaging protocol;
formatting said email, containing said media content, at said sender side, according to said email protocol and sending said formatted email to each member of said first group; and
sending said media content for distribution according to said IM protocol or said cellular messaging protocol for each member of said second group;
wherein said formatting comprises formatting a plurality of RCPT TO fields in said email to include at least one member of said first group and not to include any member of said second group while at least one TO field in respective said email includes all members of said first group and of said second group of said multi participant messaging session.

27. A system of managing a multi participant messaging session among a plurality of session participants, comprising:
a plurality of processors, installed in a plurality of client terminals, executing code for detecting a plurality of electronic mails and a plurality of instant messaging (IM) messages or a plurality of cellular messages exchanged among said plurality of session participants participating during said multi participant messaging session; and
a repository that manages for each of said plurality of session participants a user preference profile defining a preferred messaging protocol selected from an email protocol, an IM protocol, and a cellular messaging protocol;
wherein said code comprising code instructions for:
identifying, using said repository, a first group in said plurality of session participants, each member of said first group is defined in said repository as having an email protocol as said preferred messaging protocol; and
identifying, using said repository, a second group in said plurality of session participants, each member of said second group is identified in said repository as having an IM protocol or a cellular messaging protocol as said preferred messaging protocol;
wherein at least one of said plurality of processors and at least one email server executes code instructions for formatting said plurality of electronic mails, having email content, according to said email protocol and sending said formatted plurality of electronic mails to each member of said first group;
wherein said formatting comprises formatting a plurality of RCPT TO fields in each one of said plurality of emails to include at least one member of said first group and not to include any member of said second group while at least one TO field in respective said email includes all members of said first group and of said second group of said multi participant messaging session;
wherein at least one of said plurality of processors and said at least one email server executes code instructions for forwarding said email content for distribution according to said IM protocol or said cellular messaging protocol to each member of said second group.

* * * * *